(12) United States Patent
Chen et al.

(10) Patent No.: US 10,838,868 B2
(45) Date of Patent: Nov. 17, 2020

(54) PROGRAMMABLE DATA DELIVERY BY LOAD AND STORE AGENTS ON A PROCESSING CHIP INTERFACING WITH ON-CHIP MEMORY COMPONENTS AND DIRECTING DATA TO EXTERNAL MEMORY COMPONENTS

(71) Applicant: INTERNATIONAL BUSINESS MACHINES CORPORATION, Armonk, NY (US)

(72) Inventors: Chia-Yu Chen, Westchester, NY (US); Jungwook Choi, Chappaqua, NY (US); Brian Curran, Saugerties, NY (US); Bruce Fleischer, Bedford Hills, NY (US); Kailash Gopalakrishan, San Jose, CA (US); Jinwook Oh, Fort Lee, NJ (US); Sunil K Shukla, Scarsdale, NY (US); Vijayalakshmi Srinivasan, New York, NY (US); Swagath Venkataramani, Yonkers, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 7 days.

(21) Appl. No.: 16/295,408

(22) Filed: Mar. 7, 2019

(65) Prior Publication Data
US 2020/0285579 A1 Sep. 10, 2020

(51) Int. Cl.
*G06F 12/0842* (2016.01)
*G06F 3/06* (2006.01)

(52) U.S. Cl.
CPC .......... *G06F 12/0842* (2013.01); *G06F 3/061* (2013.01); *G06F 3/0655* (2013.01); *G06F 3/0679* (2013.01); *G06F 2212/62* (2013.01)

(58) Field of Classification Search
CPC ...... G06F 3/061; G06F 3/0655; G06F 3/0679; G06F 2212/62; G06F 12/0842
(Continued)

(56) References Cited

U.S. PATENT DOCUMENTS 5,420,991 A * 5/1995 Konigsfeld ......... G06F 9/30043
711/150
5,845,148 A * 12/1998 Ichikawa .............. G06F 9/4405
710/8
(Continued)

FOREIGN PATENT DOCUMENTS

CN 101689137 A 3/2010
JP 2012506076 A 3/2012

OTHER PUBLICATIONS

Cho, H., Egger, B., Lee, J. et al. (2007). Dynamic data scratchpad memory management for a memory subsystem with an MMU. ACM SIGPLAN Notices, 42(7), pp. 195-206.
(Continued)

*Primary Examiner* — Hong C Kim
(74) *Attorney, Agent, or Firm* — Griffiths & Seaton PLLC

(57) ABSTRACT

Embodiments for implementing a communicating memory between a plurality of computing components are provided. In one embodiment, an apparatus comprises a plurality of memory components residing on a processing chip, the plurality of memory components interconnected between a plurality of processing elements of at least one processing core of the processing chip and at least one external memory component external to the processing chip. The apparatus further comprises a plurality of load agents and a plurality of store agents on the processing chip, each interfacing with the plurality of memory components. Each of the plurality of load agents and the plurality of store agents execute an independent program specifying a destination of data trans-
(Continued)

acted between the plurality of memory components, the at least one external memory component, and the plurality of processing elements.

21 Claims, 8 Drawing Sheets

(58) Field of Classification Search
USPC .... 711/117, 5, 109, 148, 149, 150; 710/240, 710/36; 712/10
See application file for complete search history.

(56) References Cited

U.S. PATENT DOCUMENTS

| | | |
|---|---|---|
| 10,564,929 B2 * | 2/2020 | Nicol .................. G06F 13/1663 |
| 2003/0110364 A1 | 6/2003 | Tang et al. |
| 2012/0221808 A1 | 8/2012 | Coon et al. |
| 2018/0060034 A1 | 3/2018 | Nicol et al. |

OTHER PUBLICATIONS

Kandemir, M., Ramanujam, J., Irwin, J. et al. (2001). Dynamic management of scratch-pad memory space. Proceedings of the 38th annual Design Automation Conference, pp. 690-695.
Anonymous. (2014). Reconfigurable Communication Network with Distributed Control. IPCOM000240011D.

* cited by examiner

PROGRAMMABLE DATA DELIVERY BY
LOAD AND STORE AGENTS ON A
PROCESSING CHIP INTERFACING WITH
ON-CHIP MEMORY COMPONENTS AND
DIRECTING DATA TO EXTERNAL
MEMORY COMPONENTS

BACKGROUND OF THE INVENTION

Field of the Invention

The present invention relates in general to computing systems, and more particularly, to various embodiments for implementing communicating memories in multiprocessor environments.

Description of the Related Art

Traditionally, a system with a plurality of processing elements having shared memory manage on-chip memory as a cache subsystem. Central Processing Unit (CPU) caches are automatically managed by hardware such that when the requested memory contents are not in the cache, the data is retrieved from external (off-chip) memory. Aside from implementing a shared cache memory, it may also be desired to implement a scratchpad memory that can be reserved for direct and private usage by the microprocessor for tasks such as temporary storage or for communicating between processes. Scratchpad memories are generally manually managed as on-chip static or "slave" memory, such that a software program explicitly addresses the memory. This allows for low latency of parallel processes to temporarily store and access data, computations or instructions with high reliability and predictability.

SUMMARY OF THE INVENTION

Various embodiments are disclosed for implementing a communicating memory between a plurality of computing components. In one embodiment, an apparatus comprises a plurality of memory components residing on a processing chip, the plurality of memory components interconnected between a plurality of processing elements of at least one processing core of the processing chip and at least one external memory component external to the processing chip. The apparatus further comprises a plurality of load agents and a plurality of store agents on the processing chip, each interfacing with the plurality of memory components. Each of the plurality of load agents and the plurality of store agents asynchronously execute an independent program specifying a destination of data transacted between the plurality of memory components, to at least one external memory component, and the plurality of processing elements. Executing the independent program further includes executing explicit synchronization instructions using a handshake operation between each of the plurality of load agents and the plurality of store agents to avoid read-before-write collisions while the data is transacted to the destination.

In addition to the foregoing exemplary embodiment, various other method and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
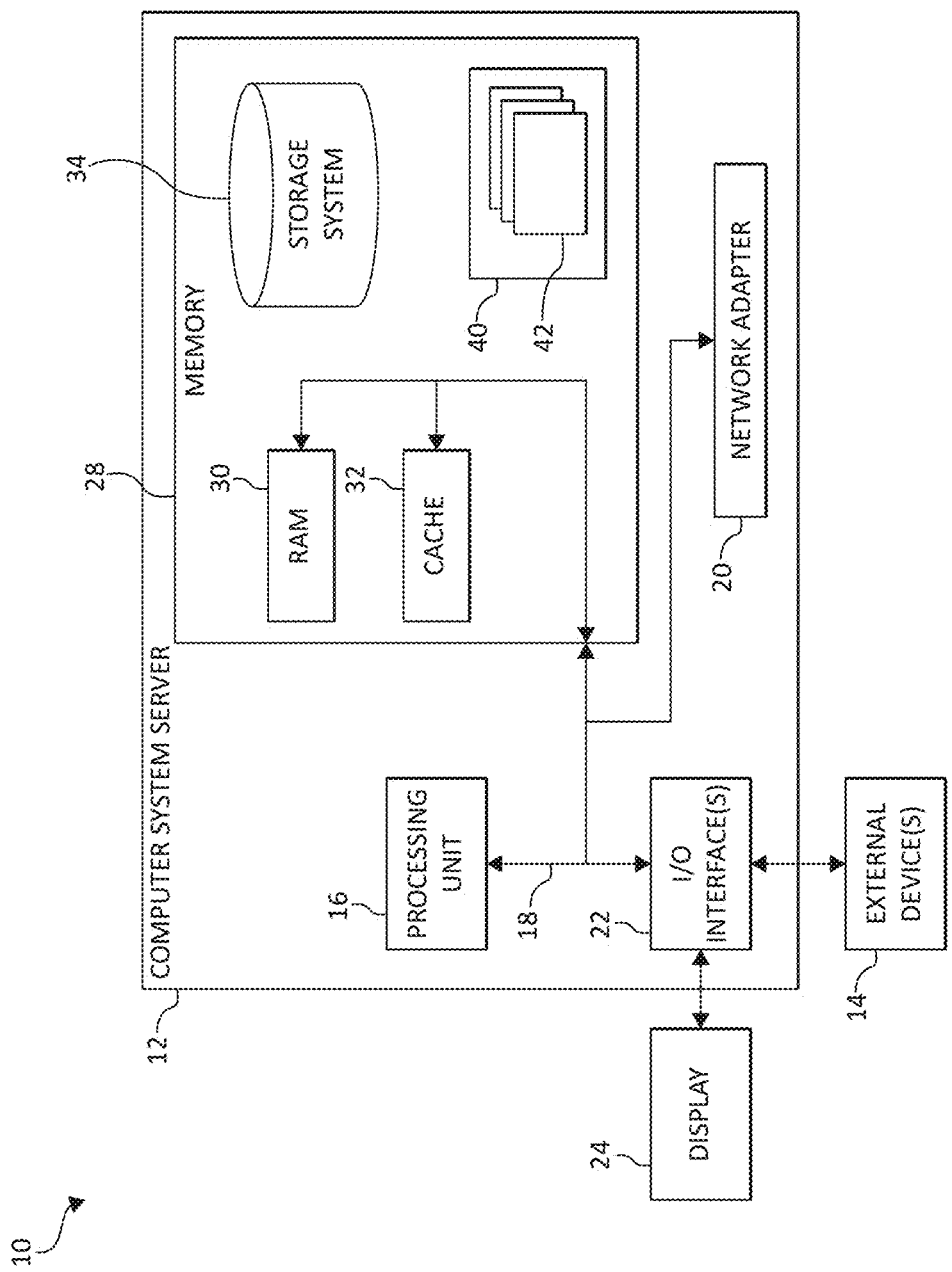
FIG. 1 is a block diagram depicting an exemplary computing node, according to embodiments of the present invention.

As aforementioned, traditionally, a system with a plurality of processing elements with shared memory manage on-chip memory as cache subsystem. Examples of such a system include several commercially available general-purpose processors and Graphical Processing Units (GPUs). As the cache is entirely managed by hardware, the mapping of memory addresses is not always tailored to the application's data access patterns requesting or writing data which is temporarily stored therein. In addition, hardware support is used for replacing data from the cache to manage the finite capacity thereof, and the candidate data for replacement is also not selected based on each application's data access requirements. Finally, if multiple processors are reading/writing the same data from the cache, it is also necessary to have hardware support to manage the order of accesses to guarantee expected behavior. As the number of processing elements continue to grow, not only does the capacity of the on-chip caches need to be increased, but also the hardware overhead for cache management also requires continued expansion. Further, hardware caches are not visible to application programmers in such a way as to be able to explicitly exploit the available capacity and bandwidth thereby making it difficult to keep the multiple processing elements fully utilized.

Thus, in such a system with a plurality of processing elements having a shared memory (e.g., a cache) and an interconnection network, it is essential to manage data delivery among the processing elements in such a way to a) minimize collisions when accessing the data (especially for data updates); b) map shared data for easy multicast of data through the interconnection network; and c) exploit the application's data access pattern to determine when to keep/discard data from the finite on-chip memory.

Explicit software-managed scratchpad memories, unlike hardware-managed caches, have been proposed to enable software-guided data placement and replacement in the on-chip memory. Such memories have their own private address space, or serve as an extended address space of the off-chip memory. The present invention hence introduces novel techniques to store and retrieve data from these software-managed scratchpad memories which serve to implement application-aware storage of programming instructions and other data to reduce latency and improve storage placement and overall performance of the processing elements executing this data. Unlike the prior work on compiler-directed software-managed memory for regular data accesses, the present disclosure specifically targets (a) increasing the bandwidth efficiency of scratchpad memory with hardware support; (b) optimally placing data in a desired level of a multi-level scratchpad memory hierarchy by software-controlled bypassing of levels in the hierarchy; and (c) software support for double-buffering data by explicitly synchronizing completion of double-buffered writes with subsequent reads of the data to a particular level or other destination (e.g., an external, off-chip memory).

The present invention further considers novel methods and apparatus' to design and operate hardware/software co-managed on-chip memory which utilizes the knowledge of the utilizing application's data access pattern to map data to the on-chip memory for a system consisting of a plurality of processing elements with an interconnection network among them and a dataflow architecture. The disclosure includes hardware mechanisms to guarantee no collisions to data accesses among the processing elements and software support to deliver data to the on-chip memory ahead of its use. This functionality and the attendant benefits thereof will be further described, following.

Referring now to FIG. 1, a schematic of an example of a computing node incorporating the aforementioned processing elements is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. In some embodiments, computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processor chips or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 (or memory subsystem 28) can include computer system readable media in the form of volatile memory, such as random access memory (RAM) 30 and/or cache memory 32. Cache memory 32 may comprise, for example, a shared cache (such as an L2 cache) which is shared among multiple cores of the processor 16 and/or may comprise a private cache (such as an L1 cache). Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
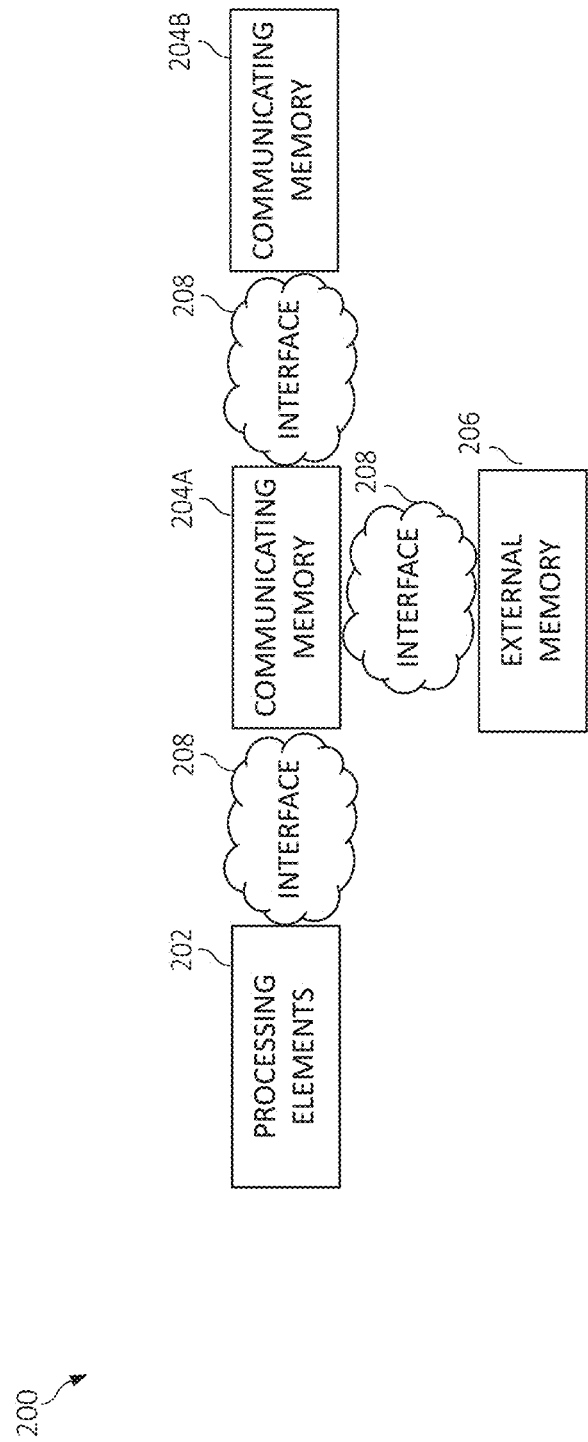
FIG. 2 is a block diagram depicting high-level communicating memory and interface components, according to embodiments of the present invention.

Continuing to FIG. 2, high-level communicating memory and interface components 200, according to embodiments of the present invention, are depicted. Components 200 include processing elements 202 (i.e., a plurality of processing elements residing on a processing chip), communicating memories 204A, 204B (i.e., physical, on-processing chip scratchpad memories), an external memory 206 (i.e., an off-processing chip memory such as an external Random Access Memory (RAM), hard disk drive (HDD), solid state drive (SSD), etc.), and an interface 208 connecting the processing elements 202, communicating memories 204A, 204B, and external memory 206. As will be further described, the interface 208 may comprise an on/off-chip interconnection network or a First-In-First-Out (FIFO).

The mechanisms of the present invention utilize components 200 to implement a system supporting a systolic dataflow architecture using a multi-level scratchpad memory that is explicitly managed by software to fetch and replace data based on a utilizing application's requirements. The system further includes on-processing chip agents (load and store agents), which may be implemented via software and/or explicit hardware, to fetch and store data into each level of the memory hierarchy. Hardware support is proposed to manage read/write accesses by these agents and guarantee synchronization between the agents such that reads do not prematurely occur before the memory is written.

In some embodiments, the system includes independent programs executing in each of the load and store agents which control the reading/writing of data to/from a given communicating memory 204A, 204B, such that each communicating memory 204A, 204B comprises its own load/store agent to communicate with one or more destinations. In some described embodiments, support for multiple source/destination interconnection communications may be utilized such that multiple sources (e.g., the communicating memory 204A, 204B, the processing elements 202, or the external memory 206) may communicate data concurrently amongst each other. The mechanisms described herein additionally include an arbitration logic among requestors to guarantee that no collision of data read/writes occurs within the communicating memory 204A, 204B as the data is concurrently written/read, and instruction granularity support to specify the data's destination.

In some embodiments, hardware support for data delivery to/from the communicating memories 204A, 204B via the interface 208 using FIFOs or an on-chip/off-chip interconnection network may be implemented, such that the FIFOs logic may be used as interface to order the reads/writes to its given destination. This functionality further includes hardware and software support for synchronization between the load and store agents of the communicating memories 204A, 204B using a synchronization interface implementing the FIFO logic. Finally, in some embodiments, software mechanisms may be used to generate programs for the load/store agents of the communicating memories 204A, 204B such that the utilizing application's data access patterns may be considered to optimize data placement within the memory hierarchy.

The disclosed system includes managing data transfer from one level of the scratchpad memory hierarchy to another level using the aforementioned software agents (i.e., the load agents and the store agents). In some embodiments, in order to avoid requiring the processing elements 202 to wait for requested data, the lower level scratchpad memory is split into multiple banks each having sufficient read/write ports such that data from the higher-level scratchpad memory can be double-buffered. This allows the load agent to deliver data to the processing elements 202 from a set of scratchpad memory banks while simultaneously writing data, by the store agent, for future use in other sets of banks, with no collision therebetween.

Figure 3:
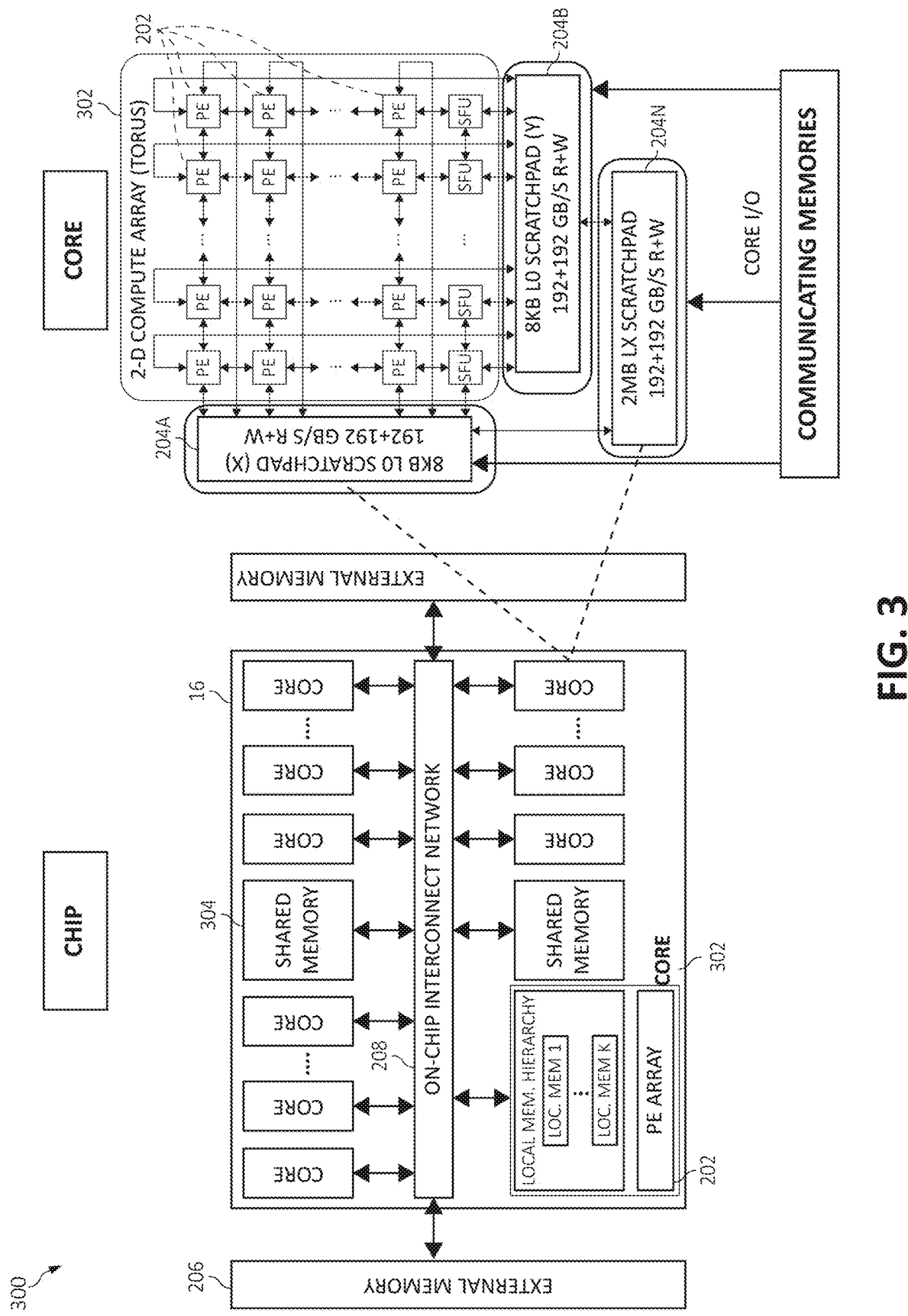
FIG. 3 is a block diagram depicting a communicating memory architecture, according to embodiments of the present invention.

FIG. 3 is a block diagram depicting a communicating memory architecture 300. The communicating memory architecture includes the processor chip 16 described in FIG. 1 which comprises a plurality of cores 302 each having an array of the processing elements 202. The processor chip further includes a shared memory 304 which communicates data within and between the plurality of cores 302 via the interface 208 (i.e., an on-chip interconnect network). The interface 208 further allows communication between the processor chip 16 and the external memory 206 (i.e., the off-chip external memory comprising the RAM, HDD, SSD, etc.).

In a preferred embodiment, assuming an array of N×N of the processing elements 202 having a 2-D-torus-like interconnection network to support systolic dataflow, wherein each level of the scratchpad memory is partitioned into N slices and each slice is independently managed by the load and store agents. Furthermore, each slice consists of multiple banks, and each of the banks are partitioned to support double-buffering of data by the store agents. Within each slice, a bank arbitration logic manages read and write requests to the bank. Architecture 300 additionally depicts a preferred embodiment of N×N of the processing elements 202 connected to two scratchpad memories (L0-X (204A) and L0-Y (204B)) in the horizontal and vertical directions, respectively. A next highest level of the scratchpad memory hierarchy is shown as Lx (204N) and is assumed to have its own partitions into slices, banks, and the supporting load and store agents.

Figure 4:
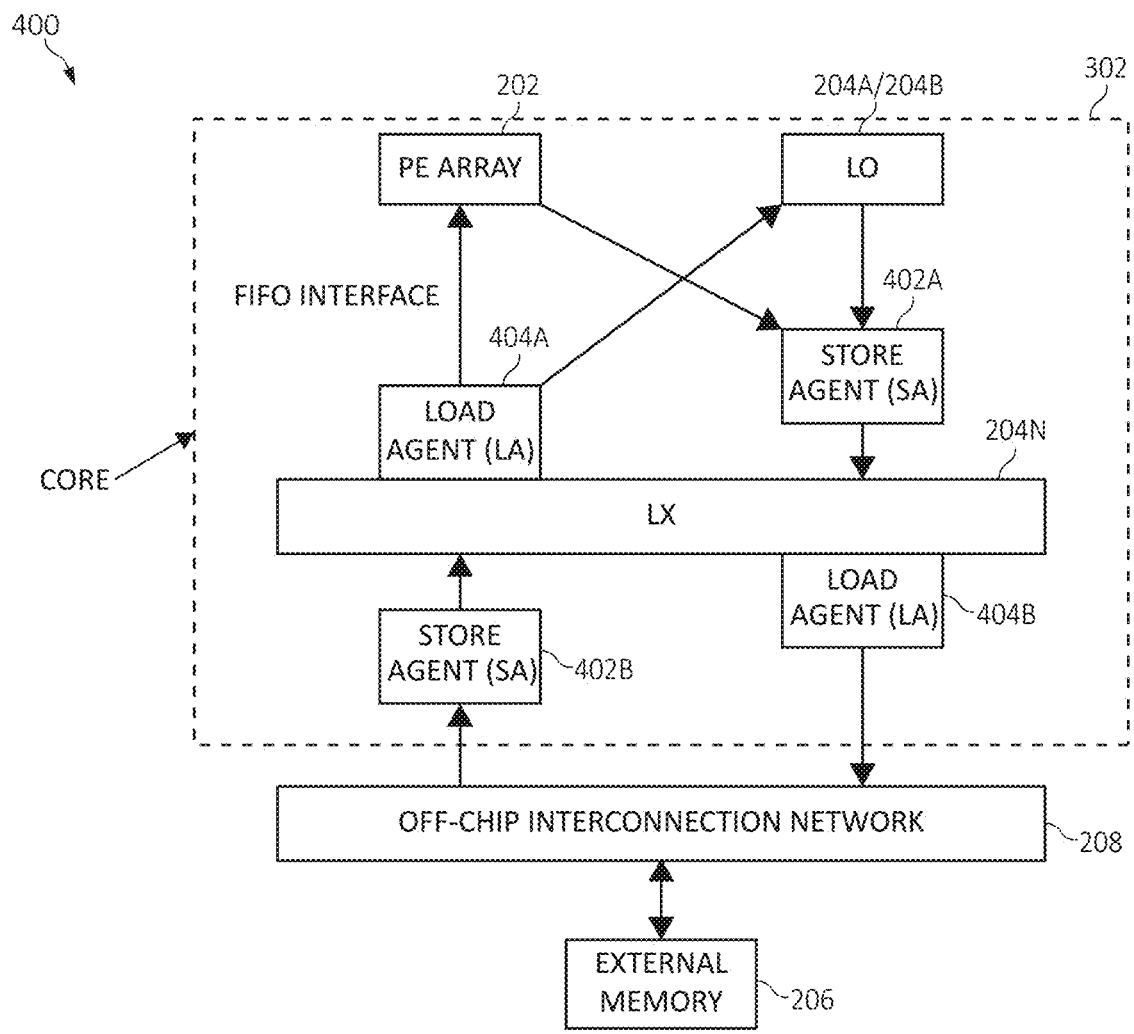
FIG. 4 is a block diagram depicting components of a hardware/software interface for communicating memories, according to embodiments of the present invention.

FIG. 4 illustrates in further detail components 400 of the architecture 300 of a respective one of the cores 302. As depicted, components 400 describe the relationship of the array of processing elements 202 using the FIFO interface 208 to communicate data between the lower level scratchpad memories (i.e., L0-X (204A) and L0-Y (204B)) and the higher level scratchpad memory (i.e., LX (204N)). The load agents 404A, 404B (referred to as LA) load data to the array of processing elements 202 and to the lower level of scratchpad memory L0 204A, 204B from the higher level scratchpad memory LX 204N, and from the scratchpad memory LX 204N to the external memory 206 via the interface 208. Similarly, the store agents 402A, 402B (referred to as SA) store data from the array of processing elements 202 and from the external memory 206 to the scratchpad memory LX 204N. It should be noted that the components 400 detail one embodiment of the flow of data through the system and that this depiction is purely exemplary. In other words, the depiction of components 400 rather serves to show that the processing elements 202, the lower level scratchpad memory 204A, 204B, the higher level scratchpad memory LX 204N and the external memory 206 are interconnected via the interface 208 and that the plurality of load agents 404A, 404B and store agents 402A, 402B are utilized to retrieve and store data to respective levels of the memory hierarchy as the individual situation necessitates.

Figure 5:
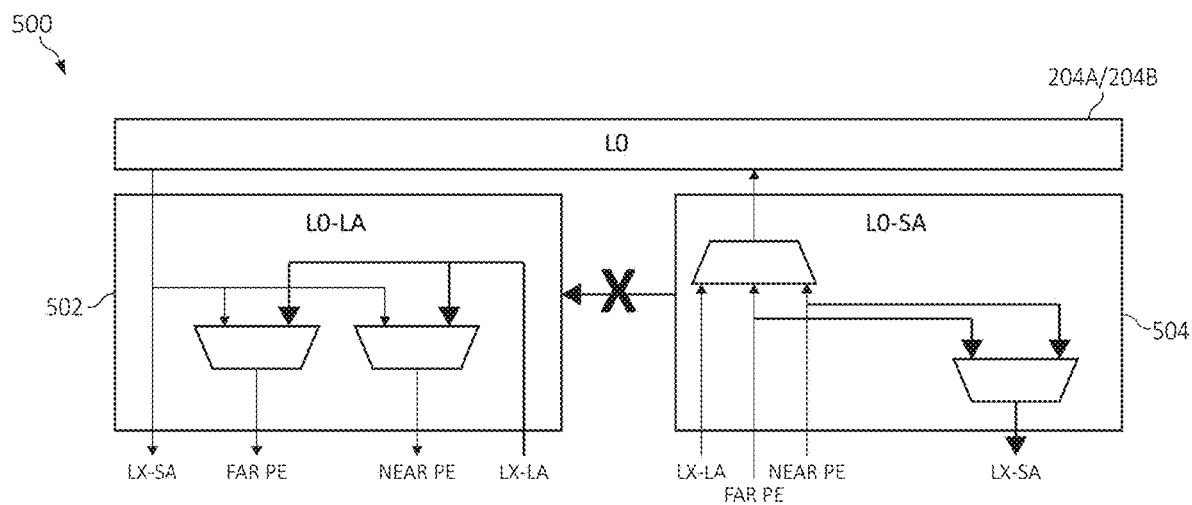
FIG. 5 is a block diagram depicting components of a hardware apparatus implementing a communicating memory, according to embodiments of the present invention.

Referring now to FIG. 5, a hardware apparatus 500 of a preferred embodiment of a single level of the scratchpad memory (lower level L0 204A, 204B). The L0-LA 502 and L0-SA 504 comprise the hardware apparatus executing the software programs of the load agents 404A, 404B and the store agents 402A, 402B, respectively. The L0-LA unit 502 illustrated includes the option of either streaming data directly from a higher level scratchpad memory (e.g., Lx 204N) or reading data from the scratchpad memory L0 204A, 204B and supplying this data to the processing elements 202. In a preferred embodiment, the L0-LA unit 502 load agent program explicitly controls the source of the data programmatically through software.

The interconnection network shown in FIGS. 3 and 4 allows data to be sent either to the closest processing element 202 (referred to as near PE) or the farthest processing element 202 (referred to as far PE) relative to the location of the particular level of scratchpad memory. In FIG. 5, the L0-SA unit 504 store agent program receives data either from the next level of the scratchpad memory hierarchy (Lx 204N) or the computational results from the near and far processing element(s) 202. In a preferred embodiment, the data and/or computational results from the processing element 202 have a special identifier to indicate whether the data is able to be stored in the scratchpad memory L0 204A, 204B or to be sent directly to the next level of the scratchpad memory Lx 204N hierarchy. In an alternate embodiment, special-purpose registers in the L0-SA unit 504 unit are programmed to indicate the destination of the data and/or computational results from the processing element 202 (i.e., the destination being scratchpad memory L0 204A, 204B or Lx 204N).

In apparatus 500, it is shown that there is no explicit transfer of data from the L0-SA unit 504 to the L0-LA unit 502. This is because the only communication between the L0-SA unit 504 to the L0-LA unit is to manage synchronization of data access to ensure that double-buffered data in the scratchpad memory L0 204A, 204B is ready to be consumed by the respective processing element 202. Explicit software instructions are used for such communication between the L0-LA unit 502 which executes a wait-for-sync instruction, and the L0-SA unit 504 which executes a corresponding send-sync instruction to confirm that the data has been written, and is ready for consumption. Similarly, the same communication in the reverse direction (i.e., from the L0-LA unit 502 (executing the send-sync instruction) to the L0-SA unit 504 (executing the wait-for-sync instruction)), exists to confirm that data loaded at the scratchpad memory L0 204A, 204B is not overwritten before used. A novel feature of the aforementioned synchronization mechanism is that software support explicitly manages this double-buffering of data by toggling the active partition and the double-buffered storage of the particular level of scratchpad memory at the end of the execution of the synchronization instruction by each LA unit.

Figure 6:
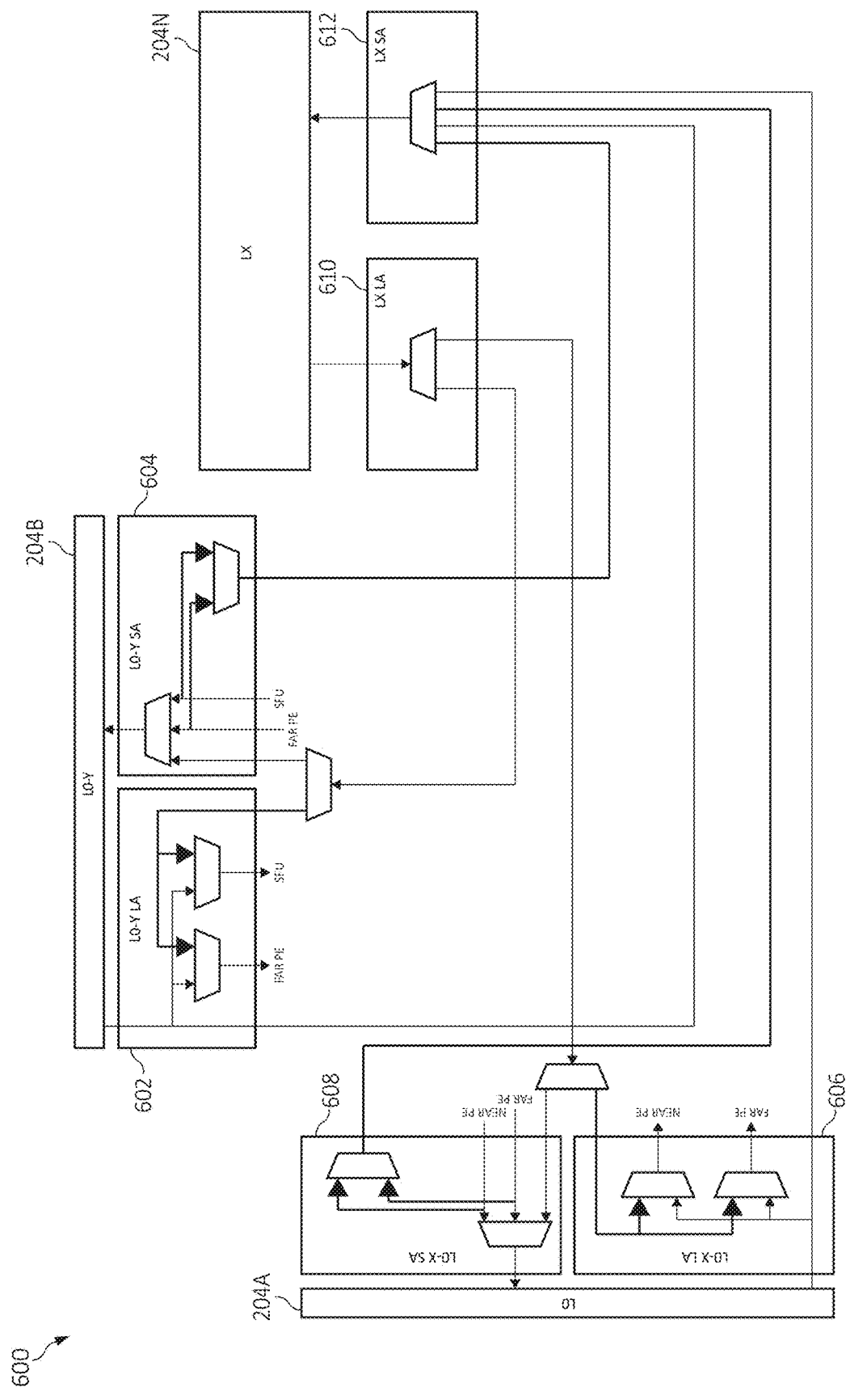
FIG. 6 is an additional block diagram depicting components of a hardware apparatus implementing a communicating memory, according to embodiments of the present invention.

FIG. 6 illustrates an additional depiction of a hardware apparatus 600 describing a preferred embodiment of a multi-level scratchpad memory hierarchy with the associated hardware support for the explicit load agents and store agents to send and receive data among the respective levels of scratchpad memories 204A-N and the processing elements 202. Apparatus 600 depicts the scratchpad memory Lx 204N and the associated LX LA unit 610 and LX SA 612 unit each executing the software programs of the load and store agents, respectively. In a preferred embodiment, the data and/or computational results stored in the scratchpad memory L0 204A is transferred to the scratchpad memory Lx 204N level using the software program of the L0-X LA unit 610 and L0-Y LA unit 602 agents. In addition, the data and/or computational results from the processing element(s) 202 can be explicitly directed using hardware support to the scratchpad memory Lx 204N (as described previously) through the L0-SA unit 504.

The Lx-SA 612 unit agent program controls the source of the data from which the data of the scratchpad memory Lx 204N will be written. Data arriving from these multiple sources have distinct identifiers, and the corresponding Lx SA unit 612 program also uses distinct identifiers to select data to be written to the scratchpad memory Lx 204N. Apparatus 600 shows a preferred embodiment in which the Lx LA unit 610 executes a software program to read the scratchpad memory Lx 204N and send data to the scratchpad memory L0 204A, 204B or to the processing elements 202. The Lx LA 610 program supplies data with target identifiers which are used by the selection logic to direct the data to either the L0-LA unit 602, 606 or L0-SA unit 604, 608 (in the X and Y directions) to either stream directly to the processing element(s) 202 or to store to the scratchpad memory L0 204A 204B, respectively.

Figure 7:
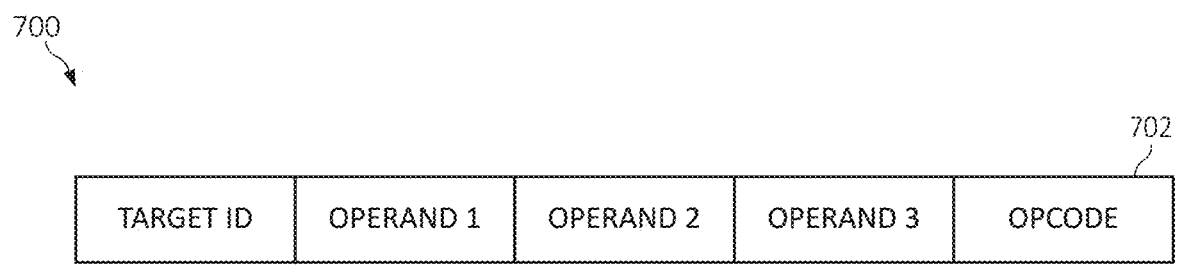
FIG. 7 is an additional block diagram depicting an example instruction with explicit destination identification for directing data within the communicating memories, according to embodiments of the present invention.

Referring now to FIG. 7, an example instruction 700 with support for more than one operands 702 (some possibly unused based on the opcode), and an explicit field with the target identification (e.g., L0-X-LA 606, L0-X-SA 608, L0-Y-LA 602, L0-Y-SA 604) in the instruction which enables the selection logic to direct the data to the designated destination in a FIFO manner to be read using the software agent in the corresponding L0 LA or SA units. In a preferred embodiment, the data arriving to/from the scratchpad memory L0 204A, 204B/Lx 204N via the corresponding LA and/or SA is queued in hardware FIFO, which maintains the order of data sent among the units and processed by the software agents.

The communicating memory system further includes a novel hardware apparatus to support scalar multiplication with a Single Instruction, Multiple Data (SIMD) vector that improves the bandwidth requirement between the scratchpad memory L0 204A, 204B and LX 204N. The software program executing in the L0-LA includes instructions which supports splatting each scalar value fetched from the scratchpad memory L0 204A, 204B by the L0-LA unit. If the SIMD width is M, this increases the data reuse for the fetched scalar M times without increasing the storage overhead in the scratchpad memory, or the bandwidth to repeatedly fetch the scalar data multiple times from the different levels of the hierarchy.

Figure 8:
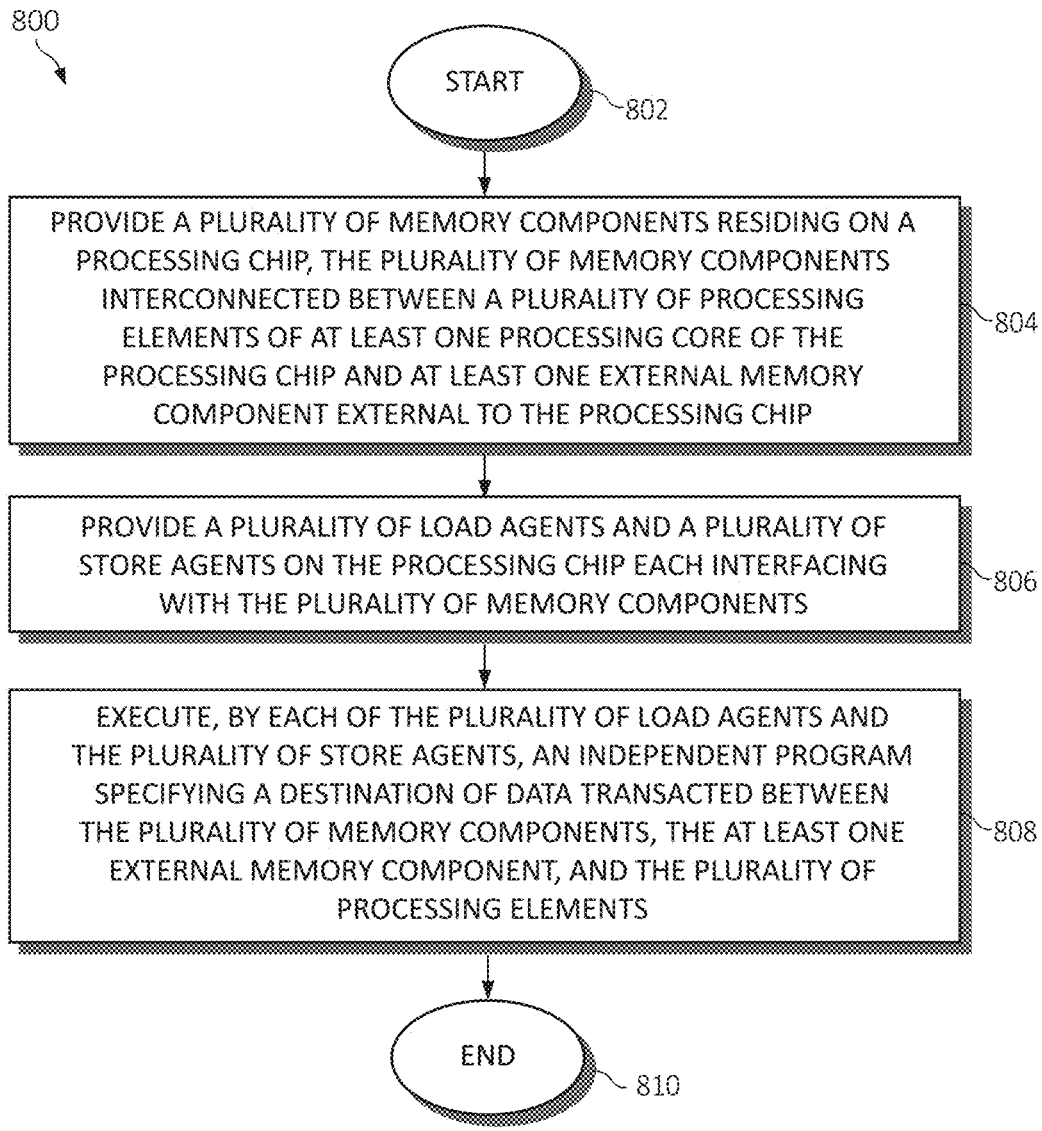
FIG. 8 is a flow chart diagram depicting a method for implementing a communicating memory between a plurality of computing components, according to embodiments of the present invention.

Turning now to FIG. 8, a method 800 for implementing a communicating memory between a plurality of computing components by a processor is depicted, in which various aspects of the illustrated embodiments may be implemented. The functionality 800 may be implemented as a method executed as instructions on a machine, where the instructions are embodied on a tangible, non-transitory machine-readable storage medium.

The functionality of the method 800 may start at step 802. In some embodiments, a plurality of memory components residing on a processing chip are provided, the plurality of memory components interconnected between a plurality of processing elements of at least one processing core of the processing chip and at least one external memory component external to the processing chip (step 804). A plurality of load agents and a plurality of store agents are additionally provided on the processing chip, each interfacing with the plurality of memory components (step 806). Each of the plurality of load agents and the plurality of store agents execute an independent program specifying a destination of data transacted between the plurality of memory components, the at least one external memory component, and the plurality of processing elements (step 808). The method 800 ends (step 810).

In conjunction with the method 800, the plurality of memory components may be arranged in a hierarchy into a plurality of levels; wherein the lowest level of the plurality of levels is divided into multiple banks each accepting the data at a plurality of ports from a higher level of the plurality of levels.

In conjunction with the method 800, each of the plurality of load agents and the plurality of store agents may concurrently communicate the data asynchronously to the destination within at least one of the plurality of processing elements, the plurality of memory components, and the at least one external memory component via the interface.

In conjunction with the method 800, the interface may comprise a First-In-First-Out (FIFO) interface or an off-chip interconnection network.

In conjunction with the method 800, executing the independent program may further include executing explicit synchronization instructions using a handshake operation between each of the plurality of load agents and the plurality of store agents to avoid data collisions while the data is transacted via a common scratchpad memory connecting these agents.

In conjunction with the method 800, pursuant to communicating the data concurrently, an arbitration logic may be used to handle concurrent data requests to a same destination as identified by a target identifier.

In conjunction with the method 800, each of the plurality of memory components may comprise a scratchpad memory.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for implementing a communicating memory between a plurality of computing components, by a processor, comprising:
   providing a plurality of memory components residing on a processing chip, the plurality of memory components interconnected between a plurality of processing elements of at least one processing core of the processing chip and at least one external memory component external to the processing chip;
   providing a plurality of load agents and a plurality of store agents on the processing chip, each interfacing with the plurality of memory components; and
   executing, by each of the plurality of load agents and the plurality of store agents, an independent program specifying a destination of data transacted between the plurality of memory components, at least one external memory component, and the plurality of processing elements.

2. The method of claim 1, further including arranging the plurality of memory components in a hierarchy into a plurality of levels; wherein the lowest level of the plurality of levels is divided into multiple banks each accepting the data at a plurality of ports from a higher level of the plurality of levels.

3. The method of claim 1, wherein each of the plurality of load agents and the plurality of store agents concurrently communicate the data asynchronously to the destination within at least one of the plurality of processing elements, the plurality of memory components, and at least one external memory component via the interface.

4. The method of claim 3, wherein the interface comprises a First-In-First-Out (FIFO) interface or an off-chip interconnection network.

5. The method of claim 3, wherein executing the independent program further includes executing explicit synchronization instructions using a handshake operation between each of the plurality of load agents and the plurality of store agents to avoid data collisions while the data is transacted.

6. The method of claim 5, further including, pursuant to communicating the data concurrently, using an arbitration logic to handle concurrent data requests to a same destination as identified by a target identifier.

7. The method of claim 1, wherein each of the plurality of memory components comprises a scratchpad memory.

8. An apparatus for implementing a communicating memory between a plurality of computing components, comprising:
   a plurality of memory components residing on a processing chip, the plurality of memory components interconnected between a plurality of processing elements of at least one processing core of the processing chip and at least one external memory component external to the processing chip; and
   a plurality of load agents and a plurality of store agents on the processing chip, each interfacing with the plurality of memory components; wherein:
      each of the plurality of load agents and the plurality of store agents execute an independent program specifying a destination of data transacted between the plurality of memory components, at least one external memory component, and the plurality of processing elements.

9. The system of claim 8, wherein the plurality of memory components are arranged in a hierarchy into a plurality of levels; and wherein the lowest level of the plurality of levels is divided into multiple banks each accepting the data at a plurality of ports from a higher level of the plurality of levels.

10. The system of claim 8, wherein each of the plurality of load agents and the plurality of store agents concurrently communicate the data asynchronously to the destination within at least one of the plurality of processing elements, the plurality of memory components, and at least one external memory component via the interface.

11. The system of claim 10, wherein the interface comprises a First-In-First-Out (FIFO) interface or an off-chip interconnection network.

12. The system of claim 10, wherein executing the independent program further includes executing explicit synchronization instructions using a handshake operation between each of the plurality of load agents and the plurality of store agents to avoid data collisions while the data is transacted.

13. The system of claim 12, wherein, pursuant to communicating the data concurrently, an arbitration logic is used to handle concurrent data requests to a same destination as identified by a target identifier.

14. The system of claim 8, wherein each of the plurality of memory components comprises a scratchpad memory.

15. A computer program product for implementing a communicating memory between a plurality of computing components, the computer program product comprising a non-transitory computer-readable storage medium having computer-readable program code portions stored therein, the computer-readable program code portions comprising:
   an executable portion that provides communication of a plurality of memory components residing on a processing chip, the plurality of memory components interconnected between a plurality of processing elements of at least one processing core of the processing chip and at least one external memory component external to the processing chip;
   an executable portion that provides communication of a plurality of load agents and a plurality of store agents on the processing chip, each interfacing with the plurality of memory components; and
   an executable portion that causes each of the plurality of load agents and the plurality of store agents to execute an independent program specifying a destination of data transacted between the plurality of memory components, the at least one external memory component, and the plurality of processing elements.

16. The computer program product of claim 15, further including an executable portion that arranges the plurality of memory components in a hierarchy into a plurality of levels; wherein the lowest level of the plurality of levels is divided into multiple banks each accepting the data at a plurality of ports from a higher level of the plurality of levels.

17. The computer program product of claim 15, wherein each of the plurality of load agents and the plurality of store agents concurrently communicate the data asynchronously to the destination within at least one of the plurality of processing elements, the plurality of memory components, and the at least one external memory component via the interface.

18. The computer program product of claim 17, wherein the interface comprises a First-In-First-Out (FIFO) interface through at least one of an on-chip and an off-chip interconnection network.

19. The computer program product of claim 17, wherein executing the independent program further includes executing explicit synchronization instructions using a handshake operation between each of the plurality of load agents and the plurality of store agents to avoid data collisions while the data is transacted.

20. The computer program product of claim 19, further including an executable portion that, pursuant to communicating the data concurrently, uses an arbitration logic to handle concurrent data requests to a same destination as identified by a target identifier.

21. The computer program product of claim 15, wherein each of the plurality of memory components comprises a scratchpad memory.

* * * * *